E. Wadhams' Impd. Roller Journal Box.
72942
PATENTED
DEC 31 1867
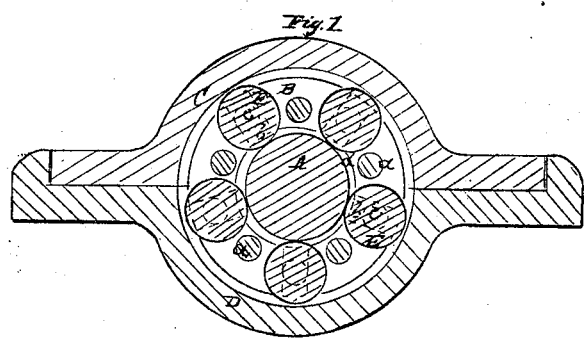
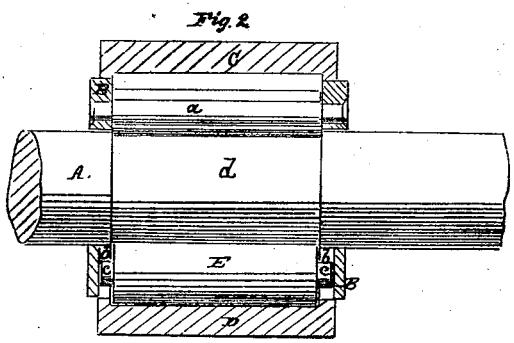
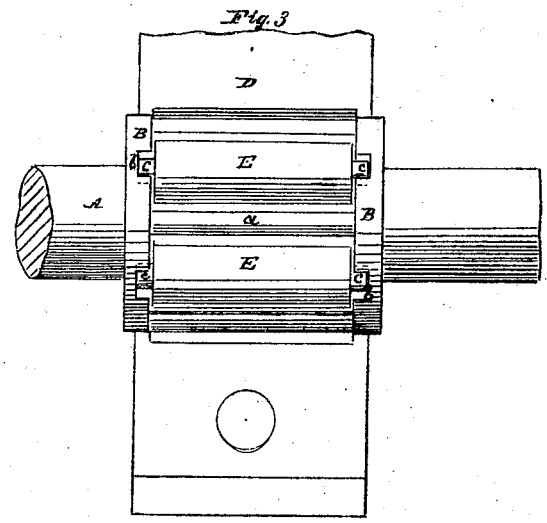
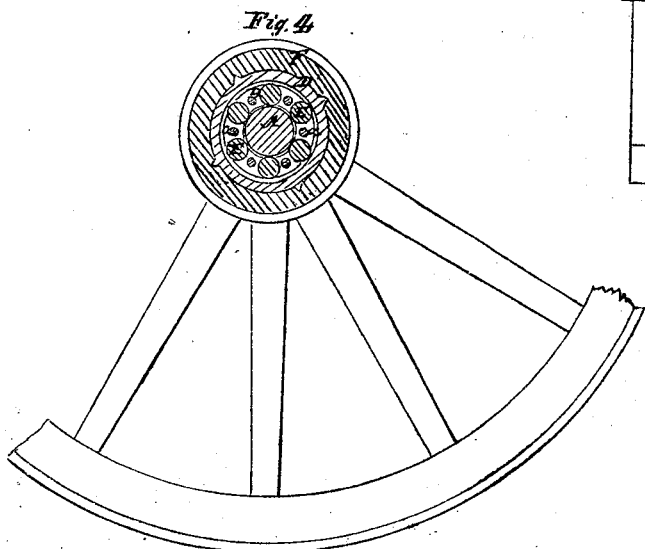
Witnesses
J W Coombs
A LeClere
Edward Wadhams

United States Patent Office.

EDWARD WADHAMS, OF YORKVILLE, NEW YORK.

*Letters Patent No. 72,942, dated December 31, 1867.*

IMPROVEMENT IN ROLLER-JOURNAL BOX.

*The Schedule referred to in these Letters Patent and making part of the same.*

TO ALL WHOM IT MAY CONCERN:

Be it known that I, EDWARD WADHAMS, of Yorkville, in the county and State of New York, have invented a new and useful Improvement in Roller-Journal Boxes, of which the following is a full, clear, and exact description, reference being had to the accompanying drawing, which forms part of this specification.

This invention has for its object the diminution of friction in bearings to axles, shafts, and wheels, or other like bodies having a rotary or turning motion about an axis, and consists in constructing a loose roller-journal box, with solid or close sides, radially grooved, channelled, or otherwise equivalently constructed internally, to receive the ends or gudgeons of the rollers, whereby, while strength is secured, dust or dirt is excluded from the interior of the box or bearing generally.

Having thus specified the object and nature of the invention, its description will now be proceeded with, in reference to the accompanying drawing, in which—

Figure 1 represents a transverse section of a roller-journal box, or bearing, as applied to carry a revolving shaft, and as constructed according to the invention.

Figure 2 a longitudinal section thereof, and

Figure 3 a plan of the same, with the gland or one portion of the outer box removed.

Figure 4 represents a transverse section of the like device, as constructed and applied to form a bearing to or for the hub of a revolving wheel.

Referring, in the first instance, to figs. 1, 2, and 3, of the drawing, A is a revolving axle or shaft; B B are sides or ends of a loose or free journal-box, arranged on the shaft or axle A, and turning independently of the latter, and in close relationship to or within a stationary outer box or bearing, C D, which may be carried by any suitable pedestal or support. These sides or ends B B are preferably made of a solid or close ring-form united by tie-bolts or connecting-pieces $a\ a$, and provided, on their inner faces, with channels or grooves $b\ b$, running, say, in a radial direction for reception of the ends or journals $e\ e$ of rollers E E, lying parallel, or thereabouts, to the axle A, and of such diameter as that they have a bearing contact with or on the shaft A and outer box or bearing. Instead of grooves $b\ b$, the ends of the rollers may work in mere holes or apertures or on pins or projections from the sides or ends B B. To prevent end or lateral play of the loose or turning journal-box, the bearing portion $d$ of the shaft A may be reduced in diameter the length of the rollers E E, so as to form collars at either end of the same. The outer box or bearing, though here shown as made up of two parts, constituting a cap-piece C and base D, may be made entire, and so that it either wholly or only partially encircles the loose roller-box. The same, or a like construction and combination of parts, is equally applicable to a vertical as to a horizontal or other position of the shaft A.

From this description it will be perceived that a general rolling action is secured to the bearing of the shaft, not simply of the rollers on their own axes, but of the roller-box itself, independently of the shaft which it serves to carry, and that the rollers have bearing-contact, both upon or against the shaft and outer box or bearing, whereby the gudgeons or ends of the rollers are relieved from strain or pressure, the slots or openings in which they lie merely or mainly serving to keep the rollers in place, and the friction generally of the shaft's bearing is materially reduced, much more so than if the rollers had fixed axes of rotation relatively to the revolving shaft or body they serve to carry.

By making the sides or ends of the loose or revolving journal-box of a close character, and merely grooving, or channelling, or otherwise equivalently constructing their inside faces, to hold in place the rollers at their ends or gudgeons, not only is strength secured, but dust or dirt excluded from the inside bearing generally.

In fig. 4 of the drawing, the same or a like arrangement of parts is exhibited as applied to the hub F of a revolving wheel, shown only in part, as, for instance, a cart or wagon-wheel, in which case the shaft, axle, or gudgeon A, is, or may be, stationary, and the outer box, bush, or bearing D', made fast to the hub, so as to rotate with it, but the intermediate loose or turning roller-box, represented by one of the sides or ends B and rollers E E, is the same in principle and action.

In describing the invention, as applied to a rotary motion, of course is included any turning movement, whether continuous or intermittently reciprocating, either for the entire or portion only of a circle.

What is here claimed, and desired to be secured by Letters Patent, is—

The anti-friction rollers E, for supporting the axle in its journal-box, or *vice versa*, when said rollers are supported by pivots C, in radial grooves or channels, $b$, in the side plates B, substantially as shown and described.

EDWARD WADHAMS.

Witnesses:
J. W. COOMBS,
A. LE CLERC.